(12) United States Patent
Galtier

(10) Patent No.: US 6,807,941 B2
(45) Date of Patent: Oct. 26, 2004

(54) TEMPERATURE PROTECTION METHOD FOR MOTOR VEHICLE ENGINE EXHAUST PIPE

(75) Inventor: Frédéric Galtier, Montpellier (FR)

(73) Assignee: Siemens VDO Automotive, Toulouse Cedex (FR)

( * ) Notice: Subject to any disclaimer, the term of this patent is extended or adjusted under 35 U.S.C. 154(b) by 129 days.

(21) Appl. No.: 10/311,237
(22) PCT Filed: Jun. 20, 2001
(86) PCT No.: PCT/EP01/06959
§ 371 (c)(1), (2), (4) Date: Dec. 17, 2002
(87) PCT Pub. No.: WO02/01070
PCT Pub. Date: Jan. 3, 2002

(65) Prior Publication Data
US 2004/0079333 A1 Apr. 29, 2004

(30) Foreign Application Priority Data
Jun. 29, 2000 (FR) .......................................... 00 08376

(51) Int. Cl.⁷ ................................................. F02P 5/00
(52) U.S. Cl. .............................. 123/406.44; 123/406.55
(58) Field of Search ..................... 123/406.44, 406.55

(56) References Cited

U.S. PATENT DOCUMENTS

| | | | | |
|---|---|---|---|---|
| 4,104,998 A | * | 8/1978 | Fenn ....................... | 123/406.55 |
| 4,703,733 A | * | 11/1987 | Fukutomi et al. ...... | 123/406.55 |
| 5,738,073 A | * | 4/1998 | Koike et al. ........... | 123/406.55 |
| 6,371,082 B1 | * | 4/2002 | Versiani et al. ........ | 123/406.44 |
| 6,668,547 B2 | * | 12/2003 | Paland ................... | 123/406.44 |

FOREIGN PATENT DOCUMENTS

| | | |
|---|---|---|
| DE | 44 06 982 | 9/1995 |
| EP | 0 890 716 | 1/1999 |
| GB | 2 279 111 | 12/1994 |

OTHER PUBLICATIONS

Patent Abstract of Japan, 04171242, Jun. 18, 1992, (Mitsubishi Motors Corp.).

* cited by examiner

Primary Examiner—Erick Solis
(74) Attorney, Agent, or Firm—Young & Thompson

(57) ABSTRACT

The temperature protection method for a motor vehicle exhaust pipe comprises steps of determining a minimum ignition angle from several possible values, including a stalling-speed angle, on the basis of predetermined logic and of engine operating parameters.

8 Claims, 2 Drawing Sheets

TEMPERATURE PROTECTION METHOD FOR MOTOR VEHICLE ENGINE EXHAUST PIPE

The invention relates to the overall field of ignition control in motor vehicle engines. It deals more particularly with the protecting of exhaust pipes, which are sensitive to overheating.

Most modern motor vehicles use, to reduce polluting emissions, exhaust systems of the catalytic type, which receive hot gases from the engine via the exhaust pipe.

These catalytic systems are particularly sensitive to excessive overheating, which destroys the chemical properties of the catalysts.

Now, it has been found that, for the phases of operation of the engine during which there is no desire to produce power, the ignition angle (often denoted IGA) for nominal ignition passes to a minimum ignition angle (which is close to stalling speed) and there is therefore a search to regulate the ignition event so that it takes place just early enough to burn the air/fuel mixture in the pistons, but with a combustion which is slightly offset in time (in comparison to normal operation) and produces no power.

This delayed combustion gives rise to a great dissipation of heat in the exhaust pipe. It is therefore essential to make sure that the temperature reached TEG (temperature of exhaust gas) can under no circumstances reach a limit which would cause the catalyst to be destroyed.

Methods for controlling temperature in exhaust pipes which employ real-time measurement of the temperature at a point on the pipe and possible injection of excess fuel into the mixture introduced in the pistons are known, this unburnt fuel (unburnt because it is in excess in the mixture) being intended solely to cool the exhaust pipe.

As will be understood, such a system is not very economical with fuel, and devices have been proposed for reinjecting the mixture leaving the catalytic system into the carburetor with a view to reducing this loss of unburnt fuel. Clearly these devices are at once complex, difficult to regulate, and expensive.

In general, temperature protection of the exhaust pipe is also obtained by keeping a margin between the minimum ignition advance to which the engine is set and the ignition advance that corresponds to stalling speed. In this way, the dissipation of heat into the pipe is reduced and this then affords protection against temperature. However, it is clear that this solution is barely satisfactory, in that it maintains the production of a certain amount of power by the engine.

The present invention therefore proposes a novel method for temperature-protecting an exhaust pipe.

According to the invention, the temperature protection method for a motor vehicle exhaust pipe comprises steps of determining a minimum ignition angle from several possible values, including a stalling-speed angle, on the basis of predetermined logic and of engine operating parameters.

As a preference, the minimum ignition angle may be set down as low as the stalling speed for periods of time in which certain engine parameters lie within a determined range of values.

The description and the drawings which follow will make it possible to gain a better understanding of the objects and advantages of the invention. Clearly, this description is given solely by way of example, and is not in any way limiting.

Figure 4:
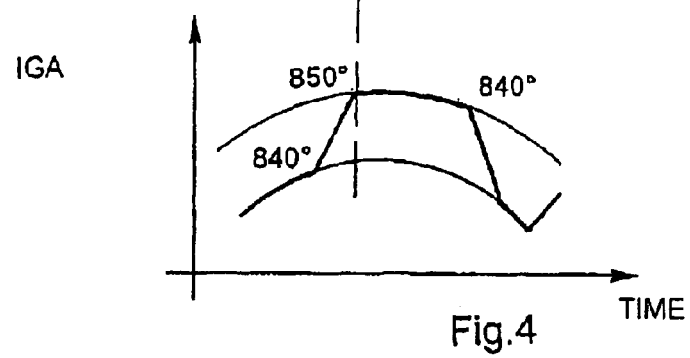

FIG. 4 illustrates, in the same way, an example of the variation over time of the ignition angle when hysteresis is present. The invention finds its niche in the context of a motor vehicle of conventional type, with pistons and atmospheric exhaust pipe. These elements as such do not form part of the present invention, and are considered to be known to those skilled in the art.

Figure 1:
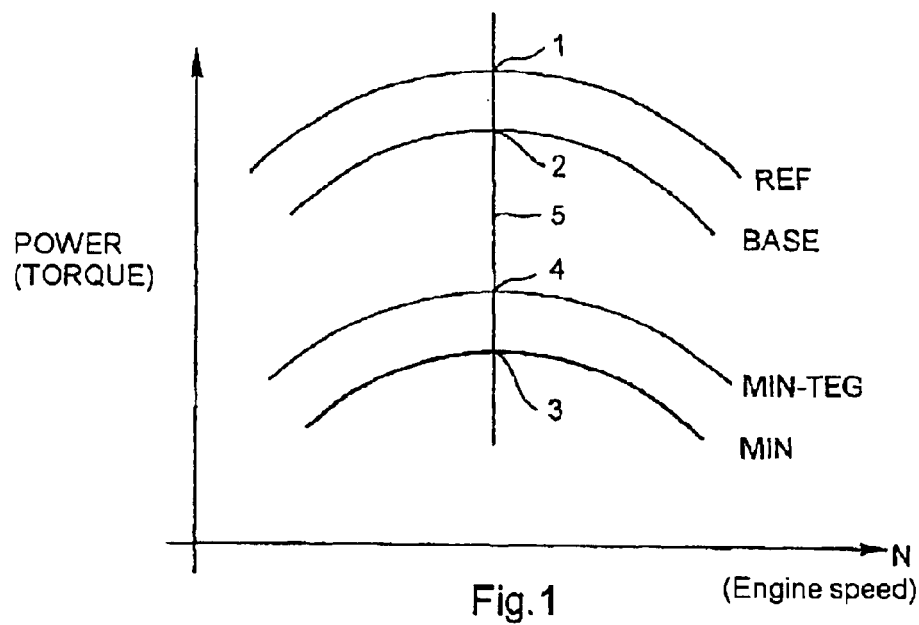
FIG. 1 illustrates the power produced by a piston engine according to the ignition advance setting.

FIG. 1 shows various curves of power as a function of engine speed N, each curve corresponding to a different setting of the ignition angle. It is simply recalled here, using FIG. 1 for reference, that, when driving the vehicle, when the driver accelerates, the engine is set to supply a maximum production of power, which corresponds to a first setting of the ignition advance IGA_REF known as the pinging angle (point 1 on the curve labeled REF, which is the curve of maximum torque produced by the engine). This setting, which is optimal from the point of view of the production of engine power, causes the engine to ping and this leads to premature wear thereof, and, in practical terms, the ignition angle is set to a second angle IGA_BASE (point 2 on the curve labeled BASE) known as the nominal angle, which is therefore set back slightly from the pinging angle.

At a given moment in time, the angle actually chosen (point 5) is often smaller than the nominal value, and naturally depends upon the total engine torque demand from the accelerator, the air-conditioning, the power-assisted steering, etc.

By contrast, when the driver lifts his foot off the accelerator to slow down or to shift gear, the ignition angle is altered and in the prior art is generally brought down to a practical minimum value IGA_MIN_TEG (point 4 on a curve known as MIN-TEG for temperature of exhaust gas) for which power is still produced, without having excessive risks of high temperature TEG in the pipe. In practice, this curve was kept very much above the stall-angle curve, so as to keep a wide safety margin.

In the present invention, it is proposed for the ignition angle to be brought down, at least during certain periods, to a third value known as the stalled angle IGA_MIN (engine speed with no production of power, point 3 on the curve labeled MIN). For this value of angle, the production of engine torque is at a minimum and the engine is simply turning over because it driven along by the motion of the vehicle. This angle simply makes it possible to ensure that the air-fuel mixture is burnt within the piston.

The present invention therefore uses the pinging angle, the nominal angle and the stalling angle, and the method consists in choosing, at each moment (or at least iteratively) one of these angles according to parameters concerned with driving and parameters concerned with the operation of the vehicle (engine, pipe, etc).

It will be understood that, in principle, the method consists in bringing the ignition angle IGA down to a point on the MIN curve for a period of time which lasts for as long as the temperature TEG measured or modeled at the inlet to the exhaust pipe or to the catalytic converter does not exceed a given threshold. As soon as the measured temperature is above a certain threshold value, the ignition angle IGA is once again altered to reduce the production of heat. This brings it back to an angle value IGA placed on the MIN TEG curve that is intermediate between the stalling angle curve and the nominal curve.

Figure 2:
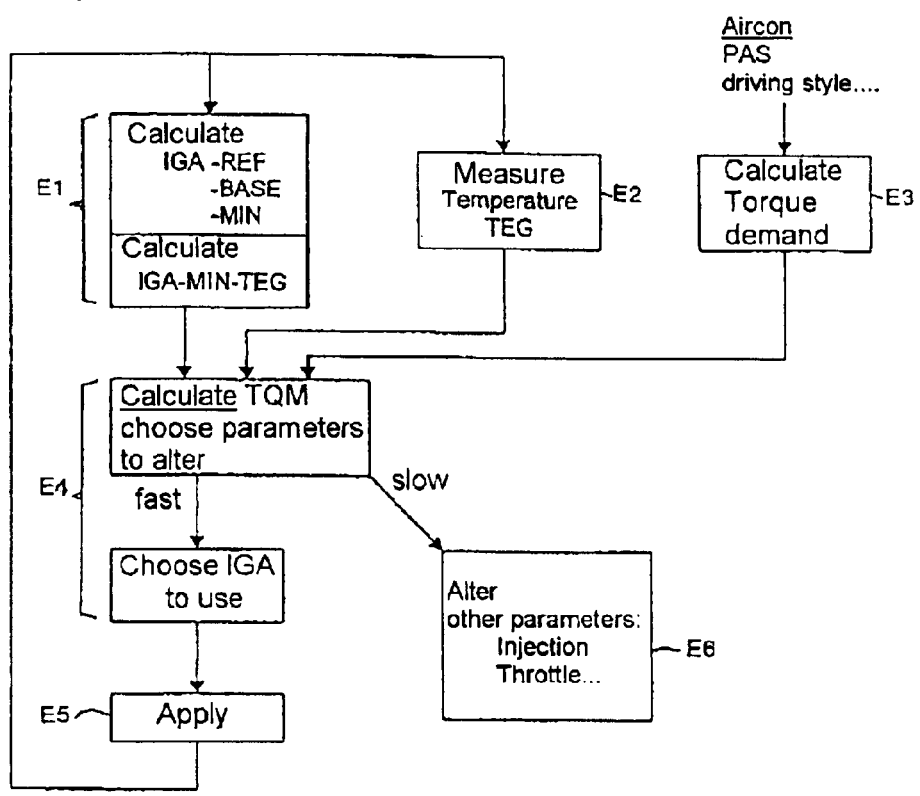
FIG. 2 shows a simplified flow diagram of the method according to the invention.

As can be seen in FIG. 2, according to the method, a first step E1 is used to calculate the values of the ignition angles corresponding to the REF, BASE and MIN curves using parameters concerned with the operation of the engine at that moment. This step E1 is also used to calculate an ignition angle MIN_TEG which takes account of the temperature actually measured or modeled at the inlet to the catalytic converter (or some other sensitive point elsewhere). This value depends on the conditions observed in the engine and on the environment at a given moment, and is not necessarily definitively fixed at the outset.

Advantageously, as will be explained in greater detail hereinafter, this value is adapted to suit the temperature gradient TEG observed when this ignition angle is used.

In a second step E2, conducted in parallel with step E1, the temperature in the pipe is modeled or measured.

In a third step E3, also conducted at the same time as the steps E1 and E2, the instantaneous torque demand is determined. This demanded-torque value depends in particular on whether or not certain devices in the vehicle, such as the air-conditioning or the power-assisted steering, are in operation, on the position of the accelerator pedal and on which gear is engaged, etc.

On the basis of this information and these parameters a step E4 chooses the minimum ignition angle that can be used at that moment, and that value is applied to the operating of the engine in step E5.

It is clear that, at the same time as altering this ignition angle value, the injection and throttle setting values (each of which also has maximum REF, nominal BASE and minimum MIN values) are also altered to achieve the desired torque (step E6)

However, the alteration to the ignition angle value can be performed very quickly and has a very quick effect on the engine torque, in comparison to adjusting the injection or the throttle valve, which are parameters that adjust slowly.

The module coordinating torque back-up and the torque-variation module (for example during a gearshift) both simultaneously use the calculation of the minimum ignition angle, taking into consideration the pipe temperature in order to determine which engine parameters need to be altered according to the current and predicted torque demand (particularly the predicted duration of the reduction in torque).

For example, during deceleration, the torque control computer TQM (the torque management system) can set the ignition angle to the minimum value. If this deceleration phase is extended, and if the minimum angle (IGA_MIN, on the MIN curve in FIG. 1) is smaller than the ignition angle, taking into consideration the temperature of the gases (IGA_MIN_TEG, curve MIN_TEG in FIG. 1) the computer TQM will decide to limit the reduction in ignition angle to a value close to IGA_MIN_TEG, and the rest of the demanded deceleration will be obtained by action on other engine parameters such as by cutting off the injection of fuel to one cylinder, etc.

The method is by nature iterative. As was stated, by way of example, if the driver lifts his foot off the accelerator pedal and in the absence of other torque demands, the computer will bring the ignition angle down to the value IGA_MIN for a few seconds and then, depending on the measured or modeled change in the value of the temperature at the inlet to the pipe, will then choose an offset value IGA_MIN_TEG for as long as necessary to bring down the temperature in the pipe.

Figure 3:
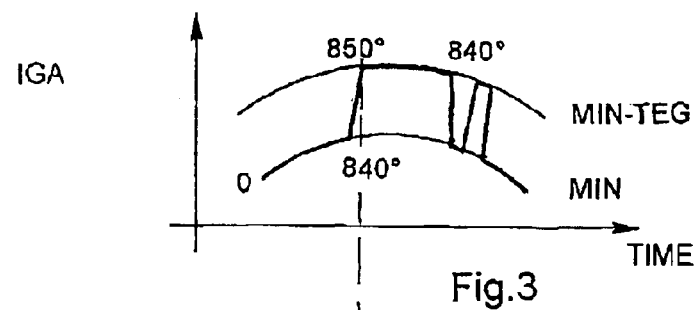
FIG. 3 illustrates an example of the variation over time of the ignition angle in the absence of hysteresis.

This situation is illustrated by FIG. 3. By way of example, the maximum temperature is not allowed to exceed 850° C. at the inlet to the pipe. In this case, the ignition angle is kept on the MIN curve until a measured temperature point of 840° (or a value giving consideration to a predetermined threshold) is reached and then brought down onto a MIN_TEG curve for as long as the temperature at the inlet to the pipe remains close to 850° C. Thereafter, successive jumps between the MIN TEG and MIN curves will be brought about, according to the temperature measured.

The minimum ignition angle that takes account of the pipe temperature (IGA_MIN_TEG) and the associated curve MIN_TEG are calculated by a matching process as soon as the ignition angle used lies on the MIN_TEG curve. This matching process analyzes the temperature gradient TEG and adjusts the value IGA_MIN_TEG to keep this gradient at a negative value. As a result, when the ignition angle is equal to IGA_MIN_TEG, the pipe temperature decreases to allow the ignition angle to revert to IGA_MIN. If the temperature gradient TEG is positive or even zero, that is to say if the temperature TEG continues to rise or remains stable, then the curve MIN_TEG and therefore the ignition angle value IGA_MIN_TEG are altered in the direction of an increased ignition angle (the curve MIN_TEG diverges from the curve MIN) until the temperature TEG drops. The new value of the ignition angle IGA_MIN_TEG is then stored in memory to be used as the initial value during the next jump between the MIN curve and the MIN_TEG curve.

When the pipe temperature no longer makes it possible for the ignition angle to be kept at the stalling-angle value (MIN), the information on the angle actually chosen is used by the computer in step E3 to alter other parameters of action on the engine (throttle, injection).

The method according to the invention is intended to be implemented by an engine parameter computer, generally already present in motor vehicles, of a nature and structure which are here considered to be known per se.

It is clear that the choice of the pipe inlet temperature as a parameter to be monitored is merely one example. It would be just as possible to decide to regulate the ignition advance using any other relevant parameter.

Likewise, the parameter for monitoring (temperature or some other parameter) may naturally be either measured directly by an appropriate sensor or modeled by the engine computer, on the basis of other engine operating information such as the inlet time, the inlet temperature, the inlet pressure, the amount of air in the pistons, the ignition angle, etc.

The same is true of the engine torque demand, which is either measured, or also modeled according to the position of the accelerator pedal and other parameters of the vehicle.

In an alternative form of embodiment, use is made of an intermediate variable TEG_HYS instead of the variable TEG for the temperature of the exhaust gases, so as to take account, among other things, of the thermal inertia of the catalytic converter. This variable represents the temperature of the gases to which hysteresis is added. This makes it possible to anticipate overheating of the exhaust system (particularly of the catalytic converter) by reducing the time for which the ignition angle can remain at the stalling level IGA_MIN. When the temperature TEG in the exhaust pipe increases, the variant TEG_HYS reaches the ignition angle setting-change threshold sooner. By contrast, when the temperature decreases, the variant TEG_HYS maintains for longer a value that forces the computer to leave the ignition angle above the minimum ignition angle value IGA_MIN. This allows for better cooling of the exhaust pipe. In this way a curve of the change in temperature and of the change in ignition angle is obtained which is closer to the curve of FIG. 4 (compare to FIG. 3).

It will have been clearly understood that the use of the previously unused ignition angle margin is novel and can be achieved by monitoring critical engine parameters and ongoing consideration of the torque demand. The scope of the present invention is not limited to the details of the embodiments considered hereinabove by way of example, but on the contrary extends to cover modifications that are within the competence of the person skilled in the art.

What is claimed is:

1. A method for controlling a vehicle engine according to the temperature of its exhaust pipe, of the type comprising the steps of determining a minimum ignition angle from several possible values comprising a stalling-speed angle (MIN, MINTEG), on the basis of predetermined logic and of engine operating parameters, characterized in that it includes a step in which the ignition angle (IGA) is returned to a stalling ignition angle (IGA_MIN) for a period which lasts as long as the temperature (TEG) at the inlet to the exhaust pipe does not exceed a given threshold, and, as soon as the temperature (TEG) exceeds a certain threshold value, the ignition angle (IGA) is brought to a second value (IGA_MIN_TEG) that takes account of the exhaust temperature (TEG).

2. The method as claimed in claim 1, characterized in that it comprises the following steps:

E1 calculating a value for the minimum ignition angle (IGA_MIN) according to the engine operating parameters of the moment, and calculating an ignition angle (IGA_MIN_TEG) that takes account of the exhaust temperature, E2 determining the temperature (TEG) in the pipe, E3 determining the torque demand, E4 choosing the engine parameters to alter according to the torque demand and choosing the minimum ignition angle (IGA) value that can be used at that moment.

3. The method as claimed in claim 2, characterized in that the calculation of the ignition angle (IGA_MIN_TEG) that takes account of the exhaust temperature includes a matching process able to alter said value in such a way that the gradient of said exhaust temperature (TEG) is negative when said ignition angle (IGA_MIN_TEG) is used.

4. The method as claimed in claim 1, characterized in that the temperature in the pipe is determined by direct measurement.

5. The method as claimed in claim 1, characterized in that the temperature in the pipe is determined by modeling.

6. The method as claimed in claim 2, characterized in that, in step E4 of choosing the engine parameters to alter, it comprises a preferred choice of altering the ignition angle and, when the exhaust temperature (TEG) exceeds a given value, altering injection and throttle setting values.

7. The method as claimed in claim 1, characterized in that the method is iterative.

8. The method as claimed in claim 1, characterized in that use is made of an intermediate variable (TEG_HYS) instead of the variable (TEG), which is the temperature of the exhaust gases, this intermediate variable comprising hysteresis with respect to the temperature (TEG) about a predetermined value.

* * * * *

UNITED STATES PATENT AND TRADEMARK OFFICE
CERTIFICATE OF CORRECTION

PATENT NO. : 6,807,941 B2 Page 1 of 1
DATED : October 26, 2004
INVENTOR(S) : Galtier It is certified that error appears in the above-identified patent and that said Letters Patent is hereby corrected as shown below:

<u>Column 2,</u>
Line 7, start a new paragraph with "The invention finds…".
Line 42, change "stalled" to -- stalling --.

Signed and Sealed this

Tenth Day of May, 2005

JON W. DUDAS
*Director of the United States Patent and Trademark Office*